United States Patent [19]
Cheng et al.

[11] Patent Number: 6,045,587
[45] Date of Patent: Apr. 4, 2000

[54] METHOD OF REDUCING COLOR AND POLYMERIZATION DECAY OF CELLULOSE VISCOSE

[75] Inventors: Meng-Song Cheng, Chang Hua; Kun Shan Huang, Tai Nan; J. H. Tsai, Tai Chung, all of Taiwan

[73] Assignee: Acelon Chemical and Fiber Corporation, Chaung Hua, Taiwan

[21] Appl. No.: 09/075,005

[22] Filed: May 9, 1998

[51] Int. Cl.$^7$ ...................... D06M 10/08; D06M 13/322; C08B 9/00; C08L 1/24
[52] U.S. Cl. ..................................... 8/116.1; 8/181; 8/189; 106/166.41; 106/200.2; 536/57; 536/60; 536/61
[58] Field of Search ............................ 106/166.41, 200.2; 536/57, 60, 61; 8/116.1, 181, 189

[56] References Cited

U.S. PATENT DOCUMENTS

| | | | |
|---|---|---|---|
| 4,163,463 | 8/1979 | O'Brien, Jr. et al. | 138/118.1 |
| 4,346,144 | 8/1982 | Craven | 428/335 |
| 5,324,795 | 6/1994 | Suenaga | 525/444 |
| 5,362,867 | 11/1994 | Chin et al. | 536/57 |

*Primary Examiner*—Yogendra Gupta
*Assistant Examiner*—Brian P. Mruk
*Attorney, Agent, or Firm*—Raymond Y. Chan; David and Raymond

[57] ABSTRACT

A method of reducing color and polymerization decay of cellulose viscose includes the step of permeating a 1,3-phenylene-bis 2-oxazoline as a polymerization anti-decay additive during dissolving a cellulose in water and a solvent to form a cellulose viscose, so as to reduce the color and the polymerization decay of the cellulose viscose.

20 Claims, No Drawings

METHOD OF REDUCING COLOR AND POLYMERIZATION DECAY OF CELLULOSE VISCOSE

FIELD OF THE PRESENT INVENTION

The present invention relates to a method of reducing color and polymerization decay of a cellulose viscose, wherein the cellulose is dissolved in a solvent which is permeated with an anti-polymerization decay additive.

BACKGROUND OF THE PRESENT INVENTION

The conventional rayon spin produced by the wet spinning production method is gradually outdated due to the fact that it requires many complicate manufacturing steps and its spinning speed is very slow, so that the production time thereof is too long and slow. Moreover, the chemical wastes such as carbon disulfide ($CS_2$) and sulfur dioxide ($SO_2$) produced during such production process substantially cause serious environment pollution.

In recent years, a new non-polluting manufacturing process called cellulose solvent spin process (also known as the solvent process) substitutes the rayon spin process, that is capable of solving the shortcomings of the rayon spin process and lowering the pollution to the environment. However, the cellulose solvent spin process still has plenty of shortcomings as described below:

1) The viscose formed by the cellulose solvent spin process has a high degree of viscosity, between 8000 poise to 12000 poise, that generates difficulties during that spinning process. In order to solve such dilemma, the industry needs to increase the spinning temperature and the production time so as to reduce the viscose's viscosity. However, to increase the spinning temperature and the production time can also result in huge decay of polymerization of the cellulose and the reduction of fiber strength of the cellulose.

2) During the conventional solvent process under such high temperature and long production time condition, if proper anti-polymerization decay additive is not added or improper anti-polymerization decay additive is added, it would darken the color of the cellulose viscose, so that additional purifying steps are required in the solvent recycle process.

3) During the conventional solvent process under such high temperature and long production time condition, if proper anti-polymerization decay additive is not added or improper anti-polymerization decay additive is added to enhance the cracking of the solvent, the solvent recycle rate is merely 94%, that would lead to unreasonable increase of manufacturing cost.

4) The commonly used additives in the conventional solvent process are the n-proply gallate (P.G) and Sodium hexametaphosphate (SHMP), that are expensive but have a relatively low effectiveness.

SUMMARY OF THE PRESENT INVENTION

The main objective of the present invention is to provide a method of reducing color and polymerization decay of a cellulose viscose that can improve the color of the cellulose viscose and solve the problem of the polymerization decay by adding an additive, namely 1,3-phenylene-bis 2-oxazoline, into the mixing solvent to reduce the cellulose viscose color and polymerization decay, so that the quality of the final fiber product can be maximized.

DETAILED DESCRIPTION OF THE PREFERRED EMBODIMENT

The present invention provides a method of reducing color and polymerization decay of a cellulose viscose which contains a α-cellulose having more than 90% long or short fibers dissolved in a mixture solvent including a N-methyl morpholine oxide and a N-methylol caprolactom mixed in a weight ratio of about 7:3. The method of reducing color and polymerization decay of a cellulose viscose comprises the steps of dissolving a cellulose in water and a solvent permeated with a polymerization anti-decay additive which includes a 1,3-phenylene-bis 2-oxazoline to form a cellulose viscose.

By permeating the polymerization anti-decay additive, 1,3-phenylene-bis 2-oxazoline, during dissolving the cellulose in the solvent with water can substantially reduce the color and polymerization decay of the cellulose viscose, wherein the chemical structure of the 1,3-phenylene-bis 2-oxazoline is:

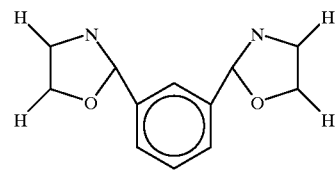

Wherein, a crude pulp solution mixing equipment is used as a mixer to mix 8% by weight of the cellulose, 46% by weight of the mixture solvent, and 46% by weight of the water with the polymerization anti-decay additive, 1,3-phenylene-bis 2-oxazoline, at a temperature between 50–60° C. to form a cellulose solution.

A film-type vacuum evaporator is used to heat the cellulose solution under a temperature between 80 to 100° C. and a reduced pressure between 50–100 mmHg for evaporating the water content in the cellulose solution to reduce to 9–11% by weight, so as to dissolve the cellulose to form the cellulose viscose.

By means of spin regenerating, water washing, and drying processes, a fiber or film product can be obtained from the cellulose viscose.

Moreover, the mixture solvent used in the present invention can be efficiently recycled. According to the present invention, by permeating the additive of the 1,3-phenylene-bis 2-oxazoline, the polymerization decay rate and coloring of the cellulose viscose is reduced.

According to the present invention as disclosed above, the utilization of the 1,3-phenylene-bis 2-oxazoline as the additive has the following characteristic and advantages:

(1) When 500 to 2500 PPM of the polymerization anti-decay additive, 1,3-phenylene-bis 2-oxazoline, is permeated in the solvent for mixing with a pulp to form a crude pulp solution, wherein the substantial amount of the additive to be added depends on the amount of the cellulose, referring to the following table 1, the additive can prevent the polymerization decay of the pulp cellulose and the coloring caused of the decomposing solvent during the dissolving process.

TABLE 1

| 1,3-Phenylene-bis 2-Oxazoline (BOX) Adding Ratio (PPM) | Penetration Rate Index (470 nm) | Polymerization Decay Rate (%) |
|---|---|---|
| 500 | 20.1 | 26.2 |
| 1000 | 15.2 | 20.5 |
| 1500 | 13.8 | 14.7 |
| 2000 | 10.2 | 11.6 |
| 2500 | 9.8 | 11.3 |

(2) The present invention has less coloring due to the addition of the additive of 1,3-phenylene-bis 2-oxazoline. As shown in Table 2, the penetration rate index detected by the spectrophotometer is reduced from 51.1 (while the n-proply gallate (P.G) is used as the additive) to 10.2. Therefore, the solvent recycle procedure can be simplified and the recycle rate of the solvent is raised.

(3) Since the present invention has less polymerization decay by the addition of the additive of 1,3-phenylene-bis 2-oxaxoline, as shown in Table 1 & 2, the polymerization decay rate is dropped below 15%.

TABLE 2

| Additive Type | Cellulose Polymerization | Cellulose Concentration | Additive Adding Ratio (PPM) | Penetration Rate Index (470 nm) | Polymerization Decay Rate (%) |
|---|---|---|---|---|---|
| Sodium Hexametaphosphate (SHMP) | 950 | 13.3% | 2000 | 46.8 | 26.1 |
| n-Proply Gallate (P.G) | 950 | 13.3% | 2000 | 51.1 | 26.7 |
| 1,3-Phenylene-bis 2-Oxazoline | 950 | 13.3% | 2000 | 10.2 | 11.6 |

(4) The additive used in the present invention is the 1,3-phenylene-bis 2-oxaxoline, referring to Table 3, which has a unit price relatively cheaper than the conventional additives such as the n-proply gallate, P.G and the sodium hexametaphosphate, SHMP, that can reduce the cost of the cellulose viscose production.

TABLE 3

| Additive Type | Unit Price | Additive Adding Ratio (PPM) | Additive Cost (US$/kg) |
|---|---|---|---|
| Sodium Hexametaphosphate (SHMP) | $30.30 | 2000 | 0.27 |
| n-Proply Gallate (P.G) | $848.48 | 2060 | 7.50 |
| 1,3-Phenylene-bis 2-Oxazoline | $29.09 | 2000 | 0.26 |

The following table 4 illustrates a comparison between the solvent process using conventional anti-polymerization decay additive, such as the n-proply gallate (P.G) and the sodium hexametaphosphate (SHMP), and the polymerization anti-decay additive of the present invention, i.e. the 1,3-phenylene-bis 2-oxaxoline (BOX), in order to demonstrate the advantages of the present invention.

TABLE 4

| | Additive of the Present Invention 1,3-Phenylene-bis 2-Oxazoline | Conventional Additive | |
|---|---|---|---|
| Viscose Quality | | n-Proply Gallate (P.G) | Sodium Hexametaphosphate (SHMP) |
| Cellulose Content (%) | 11.0 | 11.9 | 10.1 |
| Solvent Content (%) | 81.6 | 73.2 | 79.1 |
| Water Content (%) | 7.4 | 14.9 | 10.8 |
| Viscosity of the Viscose (poise/100° C.) | 10120 | 13000 | 11780 |
| Polymerization Decay Rate (%) | 11.6 | 26.7 | 26.1 |
| Penetration Rate Index (470 nm) | 10.2 | 51.1 | 46.8 |
| Solvent Recycle Rate (%) | 99.5 | 95.0 | 96.0 |

What is claimed is:

1. A method of reducing color and polymerization decay of a cellulose viscose comprising the step of permeating a 1,3-phenylene-bis 2-oxazoline as a polymerization anti-decay additive during dissolving a cellulose in water and a solvent to form cellulose viscose.

2. A method of reducing color and polymerization decay of a cellulose viscose, as recited in claim 1, wherein said cellulose is alpha-cellulose having at least 90% long or short fibers.

3. A method of reducing color and polymerization decay of a cellulose viscose, as recited in claim 1, wherein said solvent is a mixture solvent including a N-methyl morpholine oxide and a N-methylol caprolactom mixed in a weight ratio of about 7:3.

4. A method of reducing color and polymerization decay of a cellulose viscose, as recited in claim 2, wherein said solvent is a mixture solvent including a N-methyl morpholine oxide and a N-methylol caprolactom mixed in a weight ratio of about 7:3.

5. A method of reducing color and polymerization decay of a cellulose viscose, as recited in claim 1, said polymerization anti-decay additive of 1,3-phenylene-bis 2-oxazoline has a chemical structure of

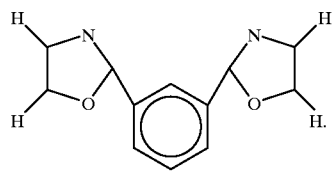

6. A method of reducing color and polymerization decay of a cellulose viscose as recited in claim 2, wherein said polymerization anti-decay additive of 1,3-phenylene-bis 2-oxazoline has a chemical structure of

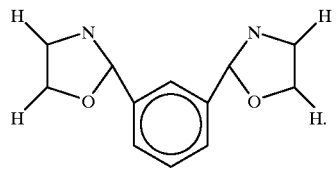

7. A method of reducing color and polymerization decay of a cellulose viscose, as recited in claim 3, wherein said polymerization anti-decay additive of 1,3-phenylene-bis 2-oxazoline has a chemical structure of

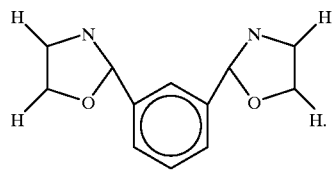

8. A method of reducing color and polymerization decay of a cellulose viscose, as recited in claim 4, wherein said polymerization anti-decay additive of 1,3-phenylene-bis 2-oxazoline has a chemical structure of

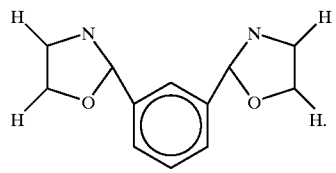

9. A method of reducing color and polymerization decay of a cellulose viscose, as recited in claim 1, wherein the step further includes the steps of:
  (a) fully mixing 8% by weight of said cellulose, 46% by weight of said mixture solvent, and 46% by weight of said water with said 1,3-phenylene-bis 2-oxazoline, at a temperature between 50–60° C. to form a cellulose slurry, and
  (b) heating said cellulose solution under a temperature between 80 to 100° C. and a reduced pressure between 50–100 mmHg for evaporating said water in said cellulose solution to reduce to 9–11% by weight, so as to dissolve said cellulose to form the cellulose viscose.

10. A method of reducing color and polymerization decay of a cellulose viscose, as recited in claim 1, wherein 500 to 2500 PPM of said 1,3-phenylene-bis 2-oxazoline is mixed with said cellulose and said solvent.

11. A method of reducing color and polymerization decay of a cellulose viscose, as recited in claim 9, wherein 500 to 2500 PPM of said 1,3-phenylene-bis 2-oxazoline is mixed with said cellulose and said solvent.

12. A method of reducing color and polymerization decay of a cellulose viscose, as recited in claim 9, wherein said cellulose is alpha-cellulose having at least 90% long or short fibers.

13. A method of reducing color and polymerization decay of a cellulose viscose, as recited in claim 9, wherein said solvent is a mixture solvent including a N-methyl morpholine oxide and a N-methylol caprolactom mixed in a weight ratio of about 7:3.

14. A method of reducing color and polymerization decay of a cellulose viscose, as recited in claim 9, wherein said polymerization anti-decay additive of 1,3-phenylene-bis 2-oxazoline has a chemical structure of

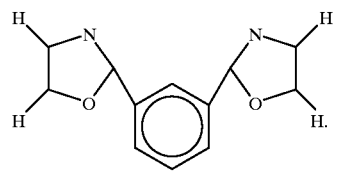

15. A method of reducing color and polymerization decay of a cellulose viscose, as recited in claim 11, wherein said cellulose is alpha-cellulose having at least 90% long or short fibers.

16. A method of reducing color and polymerization decay of a cellulose viscose, as recited in claim 15, wherein said solvent is a mixture solvent including a N-methlyl morpholine oxide and a N-methylol caprolactom mixed in a weight ratio of about 7:3.

17. A method of reducing color and polymerization decay of a cellulose viscose, as recited in claim 16, wherein said solvent is a mixture solvent including a N-methyl morpholine oxide and a N-methylol caprolactom mixed in a weight ratio of about 7:3.

18. A method of reducing color and polymerization decay of a cellulose viscose, as recited in claim 17, said polymerization anti-decay additive of 1,3-phenylene-bis 2-oxazoline has a chemical structure of

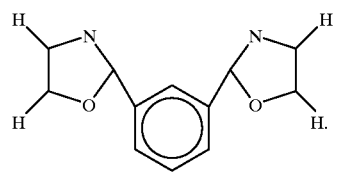

19. A method of reducing color and polymerization decay of a cellulose viscose, as recited in claim 18, wherein said mixing step (a) is processed in a mixer which is a crude pulp slurry mixing equipment, and said heating step (b) is processed in a film-type vacuum evaporator.

20. A method of reducing color and polymerization decay of a cellulose viscose, as recited in claim 19, wherein said cellulose viscose produced is further rendered to form a fiber or film product by means of spin regenerating, water washing, and drying processes.

* * * * *